US007042804B2

(12) United States Patent
Guanter

(10) Patent No.: US 7,042,804 B2
(45) Date of Patent: May 9, 2006

(54) DEVICE AND METHOD FOR MANAGING MEMORY IN AN ELECTRONIC WATCH

(75) Inventor: Jean-Charles Guanter, Diesse (CH)

(73) Assignee: Asulab S.A., Marin (CH)

( * ) Notice: Subject to any disclaimer, the term of this patent is extended or adjusted under 35 U.S.C. 154(b) by 489 days.

(21) Appl. No.: 10/329,505

(22) Filed: Dec. 27, 2002

(65) Prior Publication Data

US 2003/0123327 A1 Jul. 3, 2003

(30) Foreign Application Priority Data

Dec. 27, 2001 (CH) .................................... 2375/01

(51) Int. Cl.
*G06F 7/00* (2006.01)
*G06F 12/00* (2006.01)

(52) U.S. Cl. ......................... 368/10; 711/101; 707/101

(58) Field of Classification Search ........ 711/100–106; 707/100–102; 368/10, 76, 223, 242, 84, 368/89

See application file for complete search history.

(56) References Cited

U.S. PATENT DOCUMENTS 4,713,756 A * 12/1987 Mackiewicz et al. ....... 365/228
4,780,839 A 10/1988 Hirayama
4,912,629 A * 3/1990 Shuler, Jr. ................... 707/206
5,261,045 A * 11/1993 Scully et al. ............... 715/751
5,408,633 A 4/1995 Katsumura et al.
6,219,772 B1 4/2001 Gadangi et al.
6,249,852 B1 6/2001 Benayon et al.
6,605,038 B1 * 8/2003 Teller et al. ................ 600/300
6,681,287 B1 * 1/2004 Chan .......................... 711/104
6,757,000 B1 * 6/2004 Nagashima et al. ........ 715/835
6,760,821 B1 * 7/2004 Stefan et al. ............... 711/154
6,871,261 B1 * 3/2005 Proebsting .................. 711/106
2003/0097435 A1 * 5/2003 Kwon et al. ................ 709/223

FOREIGN PATENT DOCUMENTS

DE 100 40 241 A1 3/2001

* cited by examiner

*Primary Examiner*—Kamand Cuneo
*Assistant Examiner*—Jeanne-Marguerite Goodwin
(74) *Attorney, Agent, or Firm*—Sughrue Mion, PLLC

(57) ABSTRACT

The device for managing memory in an electronic watch of the diary type includes a non-volatile memory (15) connected to a microprocessor unit (14). The unit is programmed to manage data and/or parameter storage and/or deletion operations in the memory. Activation of at least one key of the watch (C1) allows an instruction to be provided to the unit for managing data and/or parameter storage and/or deletion operations. The memory (15) includes a first static zone (100) for storing data and/or parameters in fixed memory locations and a second dynamic zone (101) for storing data records of different types. The memory location of each type of record is managed by the microprocessor unit (14) as a function of the modification or deletion of certain records and as a function of the storage of new records. Each record starts with a heading in which two pointers are placed to establish a link with a following record and a preceding record of the same type. The microprocessor unit (14) allows the data record memory case to be compacted or compressed in the dynamic zone (101) automatically or by activating at least one key of the watch (C1).

16 Claims, 6 Drawing Sheets

DEVICE AND METHOD FOR MANAGING MEMORY IN AN ELECTRONIC WATCH

SUMMARY OF THE INVENTION

The present invention concerns a device for managing memory in an electronic watch with digital and/or analogue time display, particularly in a diary watch. Several data items stored or to be stored can be edited, modified or deleted in said watch using keys. These keys can be push-buttons or sensors whose touch sensitive pads are arranged on an internal or external face of the watch crystal. The memory management device includes, in particular, a microprocessor unit programmed to manage data and/or parameter storing and/or deleting operations in a non-volatile memory. Certain operations of the unit can be controlled by action on at least one control key. This unit can also include certain modules related to the time base of the watch.

The invention also concerns a method for managing memory in an electronic watch.

Memory management concerns not only optimising the arrangement of the stored parameters and/or data and storage thereof in the memory, but also the manner in which the data stored in the memory is retrieved, modified or deleted.

The data entered in the watch preferably concern data of a diary function of the watch. When this diary function is operating, it is possible to consult previously stored data records by activating certain keys of the watch in various menus. The various menus of this diary function concern notes, an address book, a diary data transmission by radiofrequency signals and settings.

In certain selected menus, the data drafted are placed in record fields of different types. These edited records are stored in the memory so as to be able to be subsequently consulted or transmitted to a peripheral unit if the watch has short distance radiofrequency signal transmitting and/or receiving means. In these circumstances, a peripheral unit can also transmit to the watch other diary function data edited in said unit such that the watch stores the received data.

Since the electronic watch is an instrument of small volume which is powered by a low power energy source, the data records entered using the keys or data received from a peripheral unit have to be quickly stored. Moreover, the record data have to be found easily and quickly in the memory.

The invention therefore concerns a memory management device in an electronic watch, particularly a diary watch, cited hereinbefore, which is characterised in that the memory includes a first static zone for storing data and/or parameters in fixed memory locations and a second dynamic zone for storing data records of different types, the memory location of the records of each type being managed by the microprocessor unit depending on the modification or deletion of certain records and storage of new records, each record starting with a heading in which a first pointer is placed to establish a link between the records of the same type in the dynamic zone of the memory, and in that the microprocessor unit is arranged to compact or compress the stored data record memory case of the dynamic zone automatically or by activating at least one validation key of the watch.

The invention therefore also concerns a memory management method in an electronic watch, which is characterised in that it includes the steps of:

storing data records of at least one type from among several types, each record type starting with a heading in which a first pointer is placed to establish a link between the records of the same type in the dynamic zone of the memory, compacting or compressing the data record memory case stored in the dynamic zone of the memory by the microprocessor unit automatically or by activating at least one validation key of the watch, and displaying on at least one liquid crystal display of the watch a memory capacity used before or after the stored data record memory case compacting operation.

One advantage of the memory management device and method according to the invention is that it is possible to retrieve the data of each record stored in the dynamic zone of the memory quickly. In order to do this, a chain is established for each type of record by a heading of each record pointing to a preceding record and/or a following record. Thus, a chain of connection between each type of record in the dynamic zone of the memory allows one to run through and retrieve quickly the data to be displayed on at least one liquid crystal display of the watch during consultation. In order to allow the microprocessor unit to run through and retrieve these chains quickly and easily, the static zone includes pointers for each type of records designating the first and last records of each type. Moreover, an item of information as to the number of records for each type is stored in the static zone.

Another advantage of the memory management device and method according to the invention is that compression of the dynamic zone stored data record memory case can be carried out automatically or by action on at least one key of the watch. The dynamic zone memory case can be compacted or compressed automatically for example by programming the microprocessor unit to start this operation at determined periods. These programmed periods can be days, months or other durations. Since the memory of an instrument of small volume has a relatively reduced storage capacity, the memory case of the data stored in the dynamic zone of the memory has to be compacted or compressed.

Several empty cases exist between several records stored in this dynamic zone particularly following modification of records or deletion of records. In the case of modification to a record, the latter is placed after all the stored records if the modification requires a larger memory case. Thus, empty cases exist after the modified record has been moved. In addition to each record removed, an invisible destruction record replaces the deleted record. This destruction record is kept for a determined period. Since this destruction record occupies a memory case that is smaller than or equal to any other record, empty cases exist between the end of this destruction record and the following record. Thus, these data record modification or deletion operations restrict the memory capacity for storing other records. Consequently, it becomes necessary to compact or compress the stored data memory case so as to release memory case for other records to be stored.

If the data has to be sent by short distance radiofrequency signal transmitting and/or receiving means to a peripheral unit, the fact of compacting the stored data record memory case of the dynamic zone allows the transmission time to be reduced. Consequently, a reduction in power consumption can be achieved.

The memory management device for the watch preferably includes keys in the form of sensors, whose touch sensitive pads are arranged on an internal or external face of the watch crystal. Thus, in a selected setting menu, an instruction to compact or compress the dynamic zone can easily be provided to the microprocessor unit by activating at least one sensor by a user's finger. The validation sensor can advantageously be arranged at the centre of the crystal. As a safety measure, it is preferable for the validation sensor to be activated for a determined duration, for example more than 2 seconds, to start the compacting operation.

BRIEF DESCRIPTION OF THE DRAWINGS

The objects, advantages and features of the memory management device and method particularly for an electronic diary watch will appear more clearly in the following description of at least one embodiment illustrated by the drawings, in which.

DETAILED DESCRIPTION OF THE INVENTION

Figure 1:
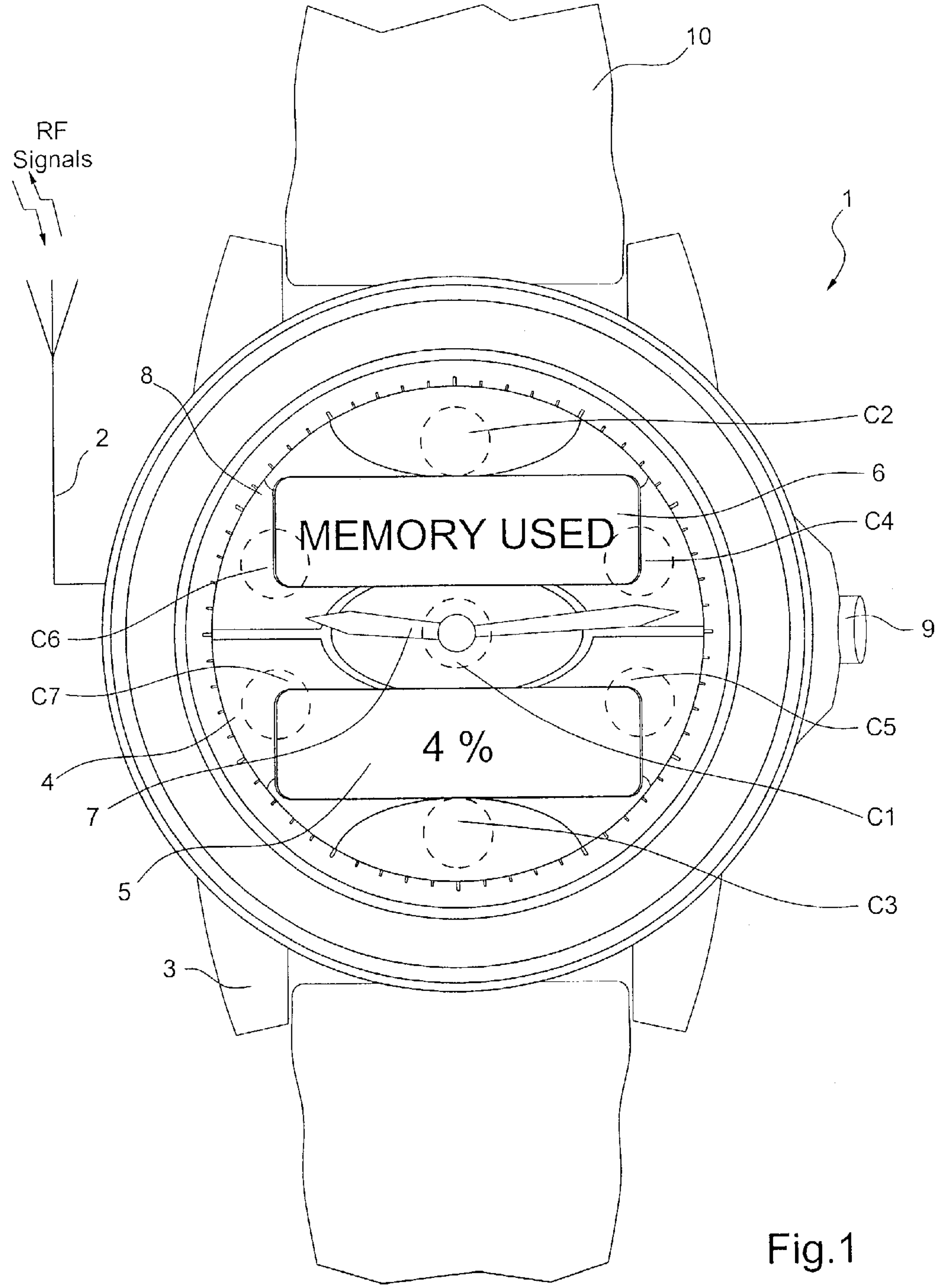
FIG. 1 shows a top view of an electronic diary watch with analogue time display that includes a memory management device according to the invention.

In the example shown in FIG. 1, diary watch 1, for implementing the memory management method according to the invention, is of the type with a wristband 10 and analogue time display. It includes, in a known manner, a case 3, delimited by a middle part incorporating a bezel and a back cover, a dial 8 with two liquid crystal displays 5 and 6 of the matrix type, hands 7 for indicating the time, keys formed of a push-button 9 and touch sensitive keys C1 to C7, and a crystal 4 closing the case. The crystal can be a scratch resistant sapphire glass.

Sensors C1 to C7 are preferably of the capacitive type. The sensitive pads of the sensors, which are very fine transparent conductive layers, are arranged on an internal face of crystal 4. These touch sensitive pads are represented in FIG. 1 by circles in dotted lines. It is quite clear that the sensors can also be of the resistive type. In such case, the sensitive pads have to be arranged on an external face of the crystal.

For technical details relating to the processing of the sensor signals, the reader may refer to European Patent document No. 0 838 737 by the same Applicant which is cited here by reference.

The case also contains under dial 8 a time-keeping circuit and/or an electronic watch movement powered by an energy source, such as a battery or an accumulator, not visible in FIG. 1, for driving hour and minute hands 7. The energy source can be formed for example of two series connected silver oxide batteries, of 1.55 V each and of the RENATA 350 type. Moreover, radiofrequency signal transmitting and/or receiving means can be provided for short distance communication with a peripheral unit, such as a computer station. Diary data can thus be transferred in a two-directional manner when communication is established. An antenna 2 of the transmitting and/or receiving means is shown in a simplified manner in FIG. 1.

The two liquid crystal displays 5 and 6 are preferably of equal dimensions located on either side of the shaft carrying the hands. These displays 5 and 6 are for example secured to the back of dial 8 and appear in two openings in dial 8. The two displays are mainly used for the diary function in order to display, in a perpendicular direction to the length of wristband 10, different menus to be consulted and edited and stored data record fields. In a selected setting menu, information as to the memory capacity used is displayed on displays 5 and 6. From this moment, by activating at least one control key, preferably sensor C1 for a determined period of time, for example greater than 2 seconds, memory compacting or compressing operations are carried out to free memory case. These compacting operations will be explained hereinafter with reference to FIGS. 5*a* and 5*b*.

In order to carry out various diary function operations, the number of sensors is comprised between three and ten and is preferably equal to seven. One sensitive pad C1 is placed at the centre of the crystal, whereas sensitive pads C2 to C7 of the other sensors are arranged at the periphery of the crystal above and below the 3 o'clock and 9 o'clock indications, and on the 6 o'clock and 12 o'clock indications. This arrangement facilitates control of various diary function operations and setting of certain parameters. Centre validation sensor C1 is mainly used for providing instructions for confirming storage and/or deletion of data, as well as for starting data memory case compacting or compressing operations.

Figure 2:
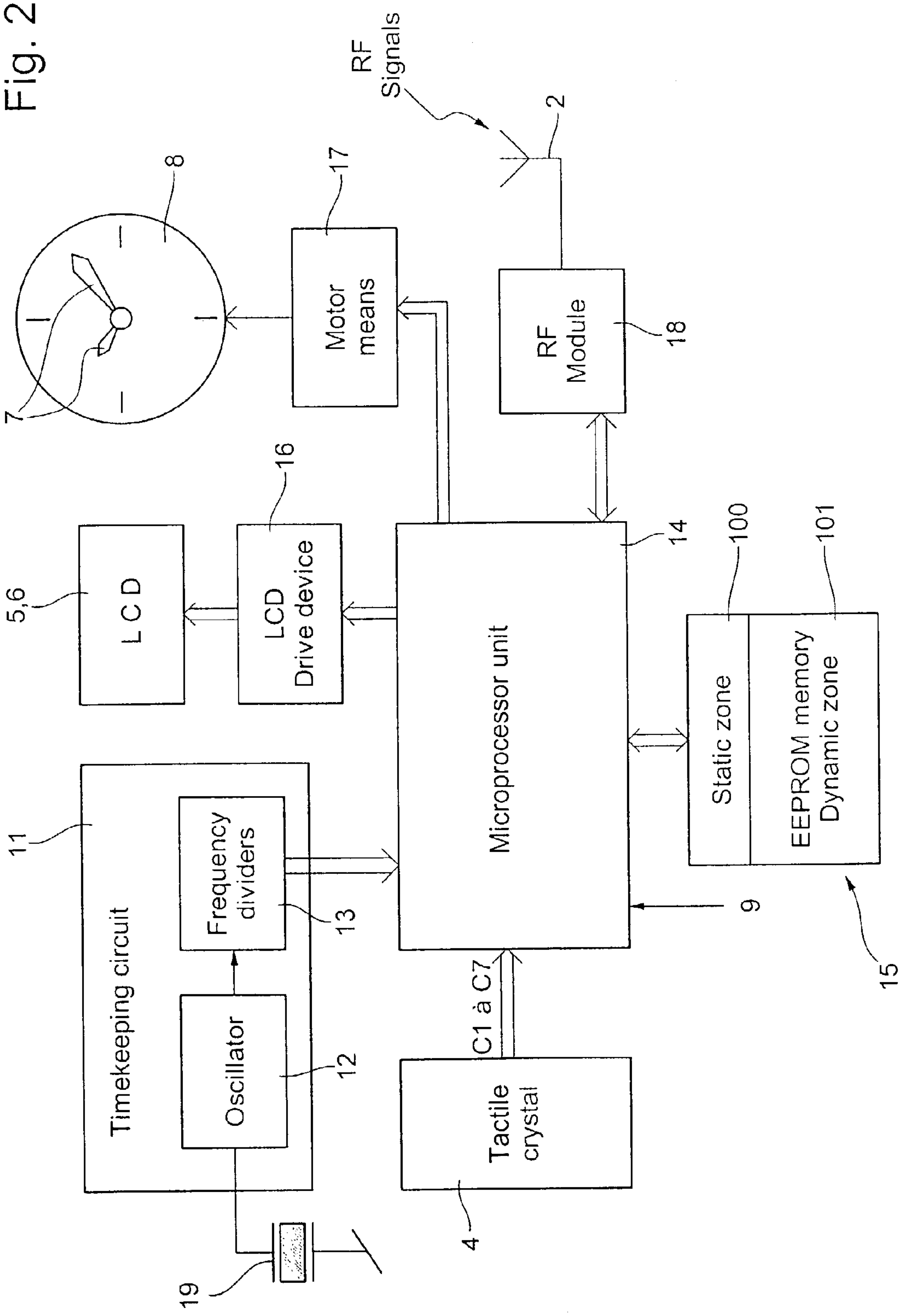
FIG. 2 shows schematically various electronic units of the diary watch including the memory management device according to the invention.

As shown in FIG. 2, the memory management device essentially includes a non-volatile memory 15, such as an EEPROM memory, connected to a microprocessor unit 14 programmed, in particular, for managing data and/or parameter storage and/or deletion operations in the memory. Microprocessor unit 14 is also capable of managing various other diary function operations, and includes certain modules that are not shown relating to the time base. The microprocessor of said unit can be for example the 8-bit PUNCH microprocessor manufactured by EM Microelectronic-Marin SA in Switzerland.

Sensitive pads C1 to C7 of the sensors of tactile crystal 4 are connected to microprocessor unit 14 of the memory management device. The connection of each sensitive pad to the unit is achieved via transparent conductive wires on the internal face of the crystal and a connector, which are not shown.

Microprocessor unit 14 can select various menus. They may be note, address, transmission and setting menus. Data records can be edited, modified or deleted mainly in the note, address and diary menus selected by the microprocessor unit. For each of these selected menus, records of different types can be stored. These data records of each type are stored in a dynamic zone 101 of non-volatile EEPROM memory 15 via microprocessor unit 14.

Microprocessor unit 14 receives signals from a time-keeping circuit 11 for clocking operations. This time-keeping circuit includes, in a known manner, an oscillator 12 connected to a quartz crystal 19 for defining the frequency of the signals exiting the oscillator, and a series of frequency dividers 13 providing several clocking signals to unit 14.

The clocking signals are also used to control motor means 17 for the watch movement to move hands 7 above dial 8. At least one drive device 16 for liquid crystal displays 5 and 6 receives control signals from microprocessor unit 14. These control signals are used to display selected menus or data record fields on liquid crystal displays 5 and 6.

Short distance radio-frequency transmitting and/or receiving means include an RF module 18 and an antenna 2. RF module 18 is connected to microprocessor unit 14. Diary data signals can be sent by the transmitting and/or receiving means in a transmission menu of the diary watch to a peripheral unit, such as a computer station or another watch. Likewise the peripheral unit or another watch can transmit diary data signals to the transmitting and/or receiving means of the watch. The data extracted from said data signals can be stored in memory 15 by microprocessor unit 14.

In order to reduce the power consumption of the energy source, sensors C1 to C7 are in a rest or standby mode when the diary function is not activated, as well as liquid crystal displays 5 and 6 and a part of microprocessor unit 14. In this standby mode, the diary watch only provides time information, and the sensors remain inactive.

Push-button 9 located on case 3 can be activated to provide an instruction to microprocessor unit 14 in order to switch on or reinitialise the diary function. In this operating mode, hands 7 are driven by motor means 17 so as to occupy a position that does not disturb the display of data on each display. Once the diary function is no longer being used, for example after a determined period of inactivity, it is deactivated. From this moment, hands 7 are returned to their time indicating position in a manner well known to those skilled in the art in this technical field.

It should be noted that one could envisage the diary function being switched on by action on at least one of sensors C1 to C7 for a determined period of time. However, in a particularly damp environment, the sensors are liable to be continually activated by the presence of water on crystal 4 of watch 1. Consequently, wasteful power consumption is likely to run down the watch battery or accumulator relatively quickly.

Non-volatile EEPROM memory 15 can include more than 64 kBytes of data and/or parameters. Memory 15 is divided into two zones. A first static zone 100 includes data and/or parameters which occupy fixed memory locations. A second dynamic zone 101 includes various types of stored data records. These record types include notes, addresses, a diary and also destruction records. These destruction records are not visible to the user of the watch. They are used solely to define note, address or diary records that have been destroyed and the date of destruction of the records. These destruction records allow a peripheral unit in communication with the watch to be informed of note, address and diary records that have been destroyed. One may provide for these destruction records to disappear after a determined period of time in accordance with programming carried out in the watch or in a peripheral unit in communication with the watch.

By way of example, it is possible to compose and store in dynamic zone 101 of the 64 kBytes memory 1920 note records, or 2100 diary records, or 333 address records with completed fields of a mean of 12 characters. For different types of records, memory 15 can store for example 100 note records, 1000 diary records and 160 addresses which is considerable for such a diary watch. However, a memory of greater capacity can be envisaged without being detrimental to the electric power consumption of the diary watch. Each record field can include for example up to 63 characters of the alphanumerical type.

The static zone includes particularly several parameters relating to horological functions for example concerning the battery level, an inhibition value concerning clock strokes or programmed alarms and the alarm anticipation time. Moreover, this static zone includes data and/or parameters concerning particularly the size and number of the memory pages, the sensor threshold, frequency adjustment values for the RF module, a record identification counter, the number of days since destruction of the destruction records, confidential codes of the watch and the computer station, the transmission date, the last computer station interrogated, the programmed tune and language.

For each type of data records stored in dynamic zone 101, pointers of the first and last records of each type are stored in static zone 100, as well as the number of records of each type. These pointers will allow the microprocessor unit to retrieve the various records of each type to be consulted in the dynamic zone quickly and easily. Moreover, an empty zone pointer indicates the location of the free memory case after the last record stored in the dynamic zone. This empty zone pointer can be used by microprocessor unit 14 to control the display of the used memory capacity.

Figure 3:
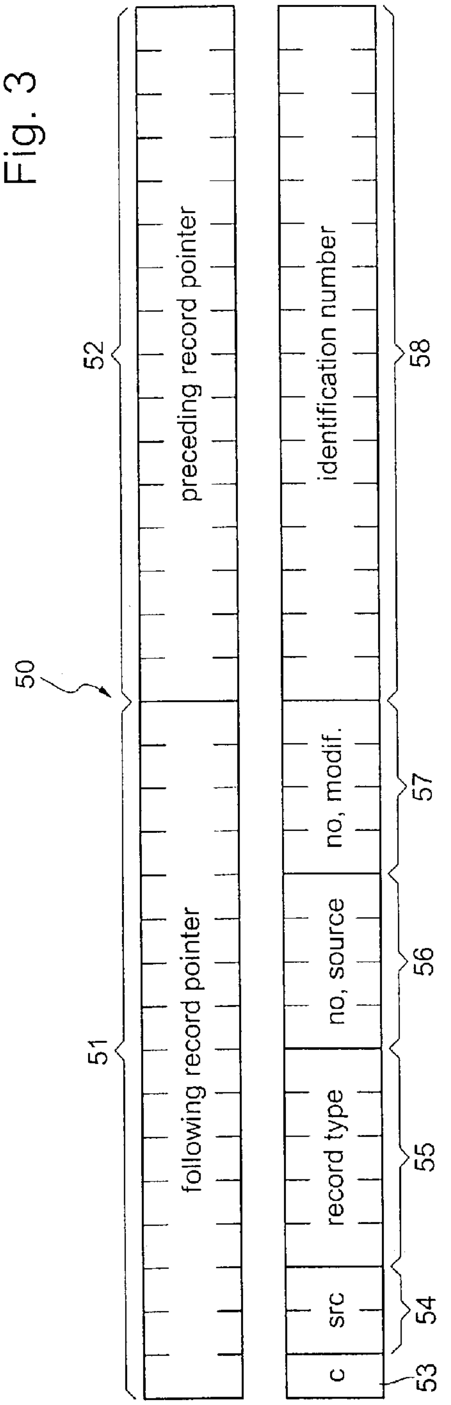
FIG. 3 shows a heading of each record stored in a dynamic zone of a nonvolatile memory of the device according to the invention.

Each type of stored data records in dynamic zone 101 begins with a heading 50 explained with reference to FIG. 3. This heading of 8 bytes includes a first pointer of the following record 51 defined over 2 bytes followed by a pointer of the preceding record 52 defined over 2 bytes. The preceding record pointer of the first record of each type stored in dynamic zone 101 refers it to the pointer of the first record in static zone 101. The following record pointer of the last record of each type stored in dynamic zone 101 refers it to the pointer of the last record in static zone 100. Owing to these next and preceding record pointers, the microprocessor unit can find all the data fields of each record type easily and quickly. These pointers allow a record chain to be created for each type that can be run through in one direction or the other.

There is also provided in heading 50, after pointers 51 and 52, a confidentiality bit c 53. If this bit 53 has a value of 1, the record is only visible if the confidentiality code of the computer station is equal to the confidentiality code of the watch. After this bit 53, two bits src 54 indicate the source of creation of the record. If the two bits 54 have a value of 01, the record is created in the watch, whereas if the two bits 54 have a value of 10, the record is created on a computer station. The combinations 00 and 11 are reserved for other uses.

Five following bits 55 define the type of records (note, address, diary, destruction). The value of these five bits corresponds to the number of fields +1 which composes the record. A note record includes two fields +1. An address record includes seventeen fields +1. A diary record includes four fields +1. Finally, a destruction field includes one field +1.

Four following bits 56 define the creation source number. This number does not change during modification of the record. The number is different for each watch or each computer station. In the present case, it is possible to attribute sixteen numbers to watches and sixteen numbers to computer stations in combination with the two bits 54.

Four following bits 57 define the record modification number. Each time that a record is modified, this modification number is incremented by 1 up to 15.

Finally, 2 bytes 58 are provided for the record identification number. Each computer station and each watch have a personal record creation counter. For each record created, a following number of the counter is allocated. This identification number does not change when the record is modified.

Examples of records of the four types stored in the dynamic zone of the memory are shown in FIGS. 4*a* to 4*d*. Each case defines a byte including two hexadecimal figures. So as to show the number of bytes of each record, the cases of the record are numbered.

Figure 4A:
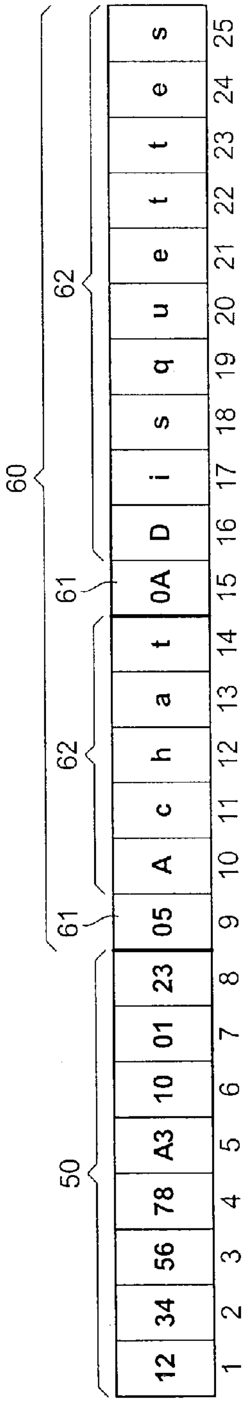
FIGS. 4*a* to 4*d* show examples of note, address, diary and destruction records stored in the dynamic zone of the non-volatile memory of the device according to the invention.

FIG. 4*a* shows an example of a note record. This record includes a heading 50 and a set 60 of two data fields 62. A byte 61 precedes each data field 62 so as to define the size of the field. This thus allows the microprocessor unit to quickly discover the location of the end of each field and also the data record.

In heading 50, it is indicated that the following record is located at hexadecimal address 1234 in cases 1 and 2. In cases 3 and 4, it is indicated that the preceding record is located at hexadecimal address 5678. At case 5, it is indicated that it is a confidential record created in the watch, and that the record is of the note type. At case 6 it is indicated that the record was created by the first watch and that it is an original record (unmodified). Finally, at cases 7 and 8 of heading 50, it is indicated that the $123^{rd}$ hexadecimal record was created by the watch that corresponds to the $291^{st}$ record in base 10.

At case 9, the size of the first data field is defined. In this case, 5 characters of the title "Achat" form the first field corresponding to cases 10 to 14. At case 15, the size of the second data field is defined. This second field is formed of 10 characters of the text "Disquettes" corresponding to cases 16 to 25.

It should be noted that each new note record stored in the dynamic zone is placed in the last position in the chain. All the note records are ordered in chronological order by edition and storage in the memory. If the title and text fields are empty, the record is deemed empty and it is not stored.

Figure 4D:
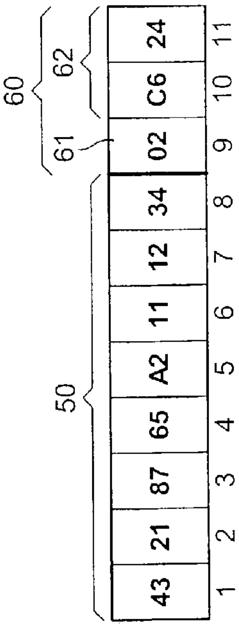
Figure 4B:
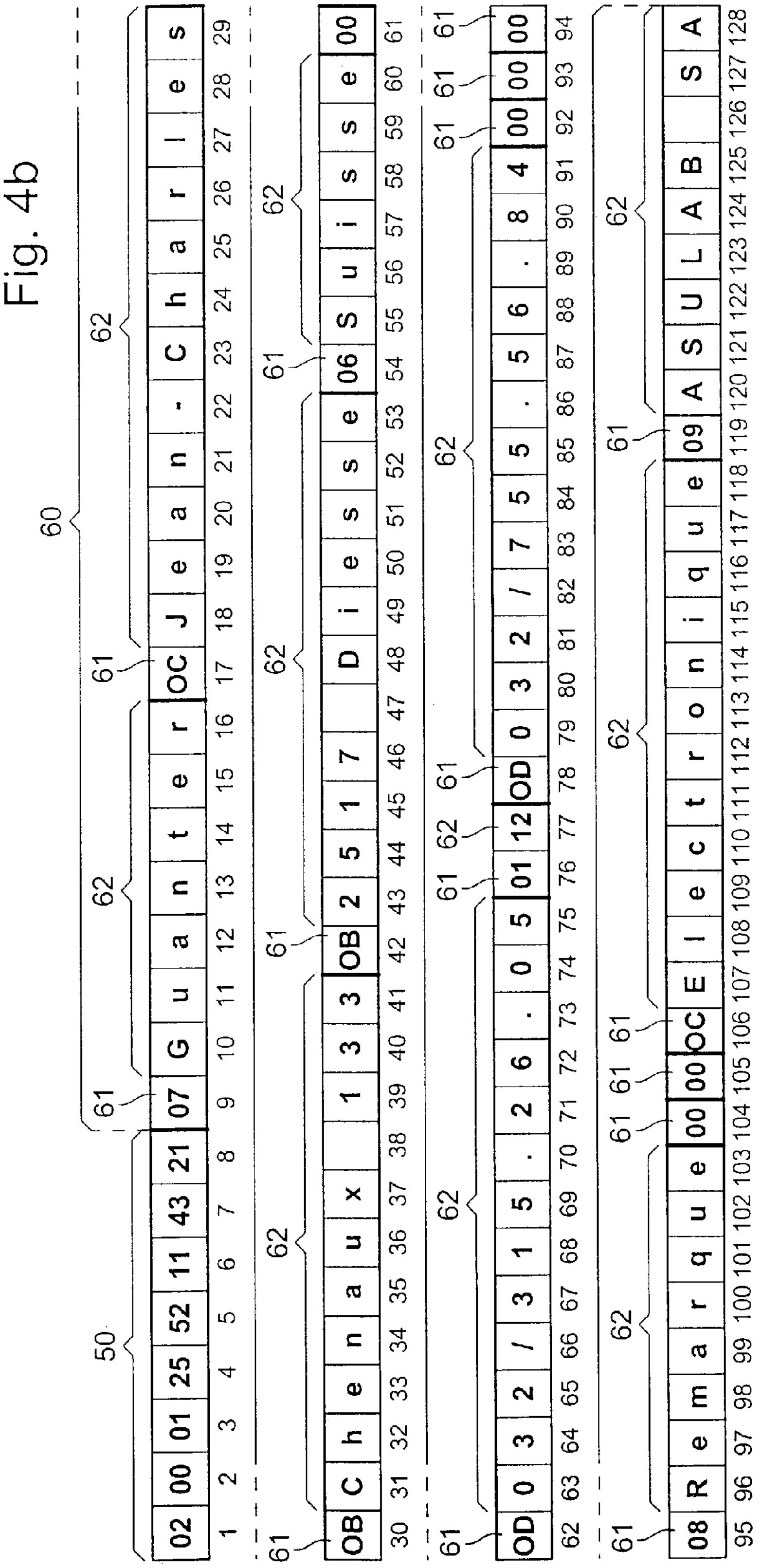

FIG. 4*b* shows an example of an address record. As for FIG. 4*a*, this record includes a heading 50 and a set 60 of seventeen data fields 62 which are not all completed. A byte 61 precedes each field to define the size of the field.

In heading 50 at cases 1 to 8, it is indicated that the following record is located at hexadecimal address 200 and the preceding record is located at hexadecimal address 125. The record is non confidential and was created in a computer station. The record is of the address type of type 18 with seventeen fields. This record was created by the first computer station and it has been modified once. The record created is the $4321^{st}$ hexadecimal record.

At case 9, the size of the first data field, which concerns the surname of the person, is defined. In this example, 7 characters of the surname "Guanter" form the first field corresponding to cases 10 to 16. At case 17, the size of the second data field, which relates to the first name of the person, is defined. In this example, 12 characters form the first name "Jean-Charles" corresponding to cases 18 to 29.

At case 30, the size of the third data field, which concerns the street where the person lives, is defined. 11 characters form this third street field "Chenaux 133" corresponding to cases 31 to 41. At case 42, the size of the fourth data field, which relates to the town where the person lives with its postal code, is defined. 11 characters form the fourth town field "2517 Diesse" corresponding to cases 43 to 53. At case 54, the size of the fifth data field, which relates to the country, is defined. 6 characters form the fifth country field "Suisse" corresponding to cases 55 to 60.

At case 61, it is indicated that there is no character forming the sixth data field relating to a first type of telephone. At case 62, the size of the seventh data field, which concerns a first telephone number is defined. 13 characters form the seventh data field of first telephone number "032/315.26.05" corresponding to cases 63 to 75. At case 76, the size of the eighth data field, which relates to another type of telephone, is defined. 1 byte forms this eighth field defining a professional telephone type by the code 12. At case 78, the size of the ninth data field, which relates to a second telephone number, is defined. 13 characters form the ninth data field of the second telephone number "032/755.56.84" corresponding to cases 79 to 91.

At cases 92 to 94, it is indicated that there are no characters forming the tenth, eleventh and twelfth fields which concern the type and number of a third telephone, as well as an email address. At case 95, the size of the thirteenth data field, which concerns a first comment, is defined. 8 characters form this thirteenth field of the first comment "Remarque" corresponding to cases 96 to 103. At case 104, it is indicated that there are no characters forming the fourteenth data field of a second comment.

At case 105, it is indicated that there are no characters forming the fifteenth field relating to a person's title. At case 106, the size of the sixteenth data field, which concerns the department in which the person works, is defined. 12 characters form this sixteenth field of the "Electronique" (Electronics in English) corresponding to cases 107 to 118. Finally, at case 119, the size of the seventeenth data field, which concerns the company of work, is defined. 9 characters form this seventeenth company field "ASULAB SA" corresponding to cases 120 to 128.

It should be noted that it is the alphabetical order of the surname and first name that defines the order of the records of the address record chain. If the first and second fields of an address record are empty, the record is deemed empty and is not stored, even if the other fields are completed.

Figure 4C:
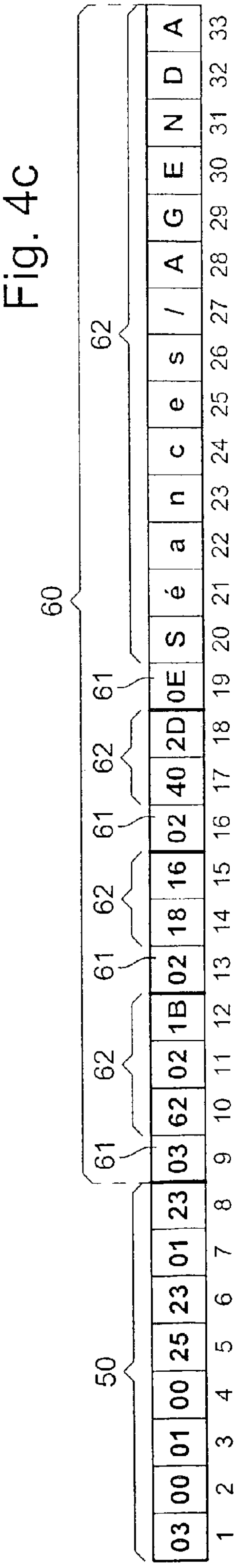

FIG. 4*c* shows an example of a diary record. As in FIGS. 4*a* and 4*b*, this record includes a heading 50 and a set 60 of four data fields 62. A byte 61 precedes each field to define the size of the field.

In heading 50 at cases 1 to 8, it is indicated that the following record is located at hexadecimal address 300 and the preceding record is located at hexadecimal address 100. The record is non-confidential and was created in the watch. The record is of the diary type of type 5 with four fields. This record was created by the second watch and has been modified three times. The record is the $123^{rd}$ hexadecimal record.

At case 9, the size of the first data field, which concerns a meeting date, is defined. In this example, 3 date data bytes form the first field representing the date 1998 Feb. 27, corresponding to cases 10 to 12. At case 13, the size of the second data field, which concerns a meeting time, is defined. 2 time bytes form the second field representing the time 11 h 30 with the alarm switched on (bit 12) and the morning indication (bit 14) corresponding to cases 14 and 15. At case 16, the size of the third data field, which concerns an end of meeting time, is defined. 2 end of meeting time bytes form this third field representing 12 h 15 in the afternoon corresponding to cases 17 and 18. Finally, at case 19, the size of the fourth data field, which concerns a text, is defined. 14 characters form this fourth text field "Séances/AGENDA" (Meetings/DIARY) corresponding to cases 20 to 33.

It should be noted that it is the chronological order of the date then the time that is decisive for defining the order of records in the diary record chain. If the fourth text field is empty, the record is deemed empty and is not stored, even if the other fields are completed.

FIG. 4*d* shows an example of a destruction record that is not visible to a user of the watch. As in FIGS. 4*a* to 4*c*, this record contains a heading 50 and a set 60 which includes a single data field 62 and a byte 61 which precedes the field to define its size.

In heading 50, at cases 1 to 8, it is indicated that the following record is located at the hexadecimal address 4321 and the preceding record is located at the hexadecimal address 8765. The destroyed record was confidential and was created in the watch. The record is of type 2 with a single field which corresponds to a destruction record. This record was created by the first watch and it has been modified once. The destroyed record is the 1234$^{th}$ hexadecimal record.

At case 9, the size of the single data field, which concerns a date of destruction, is defined. 2 bytes of the destruction date form this field representing the date 4 Jan. 1999.

These destruction records are stored in the dynamic zone of the memory in ascending order of the destruction dates. These destruction records always stay in the same place before a subsequent compacting operation, as they are formed of a field of only 2 bytes.

Figure 5A:
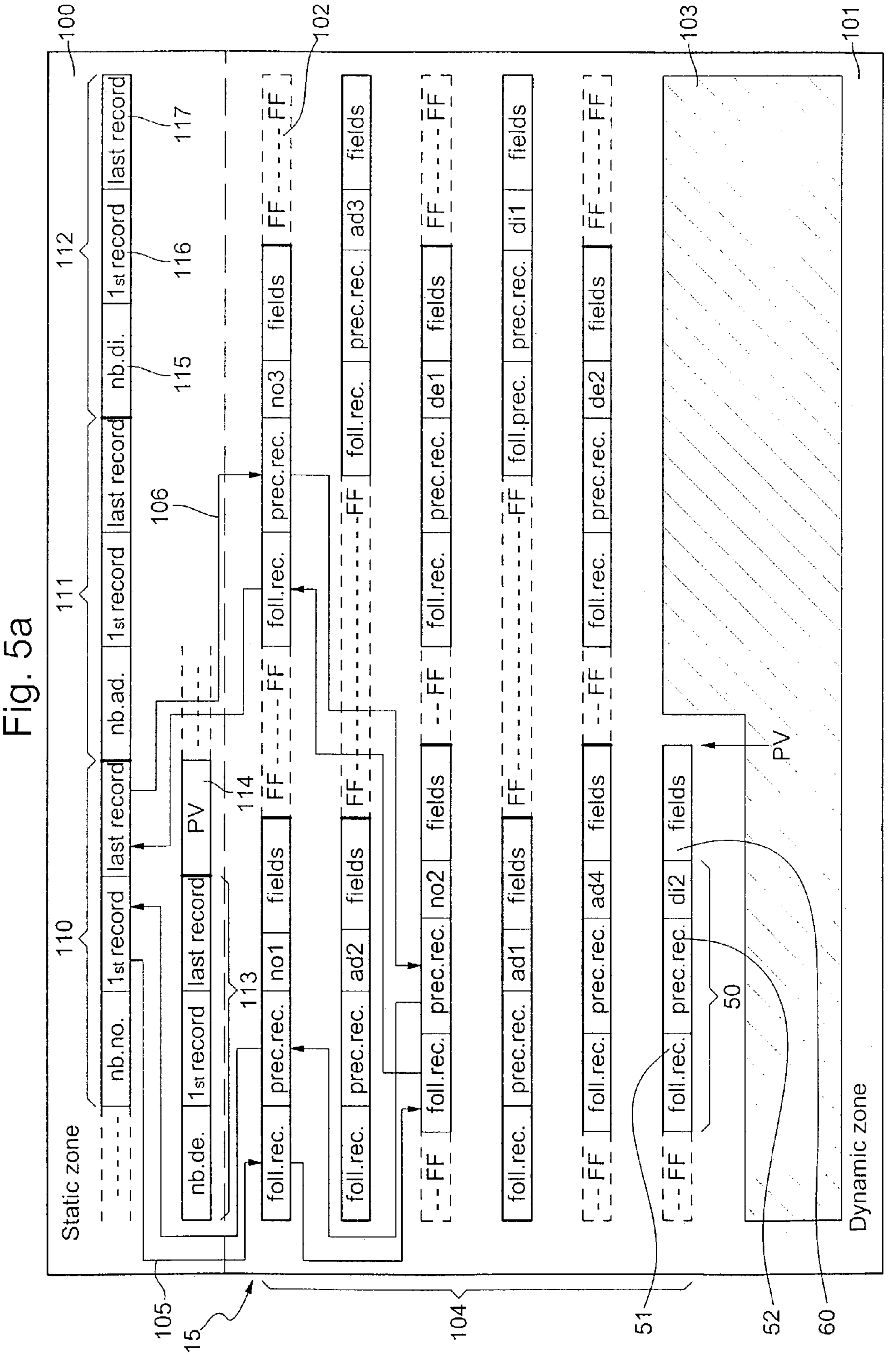
FIG. 5*a* shows, in a simplified manner, a non-volatile memory which includes a static zone and a dynamic zone with data records before the compacting operation of the method according to the invention.
Figure 5B:
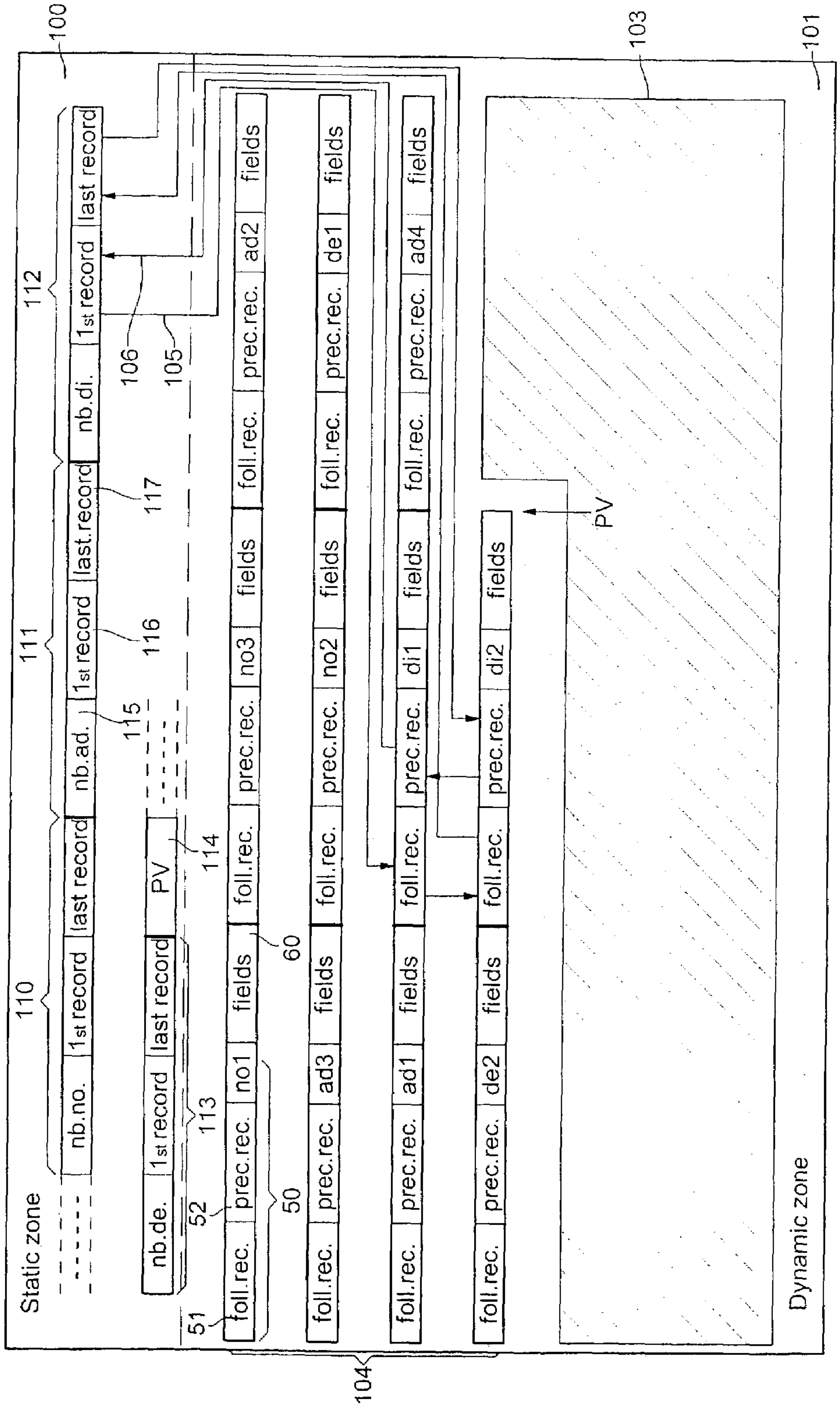
FIG. 5*b* shows, in a simplified manner, a non-volatile memory which includes a static zone and a dynamic zone with data records after the compacting operation of the method according to the invention.

FIGS. 5*a* and 5*b* show non-volatile memory 15. This memory includes a static zone 100 for storing data and/or parameters in fixed memory locations, and a dynamic zone 101 for storing records of different types. At the start, by introducing new records of different types without modifying or deleting said records, the records follow each other by order of entry in the dynamic zone of memory 15.

In these FIGS. 5*a* and 5*b*, all the different types of records have been drawn with an equal size for the sake of simplification, which is obviously not the case in reality. Normally, the destruction records are always the smallest with a 2 byte field, and the address records are the largest. The size of each record depends on the number of bytes of each data field.

Non-volatile memory 15 shown in FIG. 5*a* includes several empty cases 102 between the different types of data fields in dynamic zone 101. These empty cases are due to record modifications or record deletions. The deleted records are replaced by destruction records, whose field only includes 2 bytes, and empty cases are placed from the end of the destruction record to the following record. When a note, address or diary record is modified, the record is preferably moved in a first step to the first free byte designated by the empty zone pointer PV. Following which, several field modifications can be carried out. At the end of the modifications, if the modified record is shorter or equal to the original record, this modified record is replaced at the same initial location in the dynamic zone, and empty cases fill the freed bytes. Conversely, if the modified record is larger than the original record, it remains as the last record of the dynamic zone and the empty zone pointer is moved to indicate the end of the modified record. Empty spaces fill the freed bytes of the modified, moved record.

The empty cases between the data records are completed by several bytes having a hexadecimal value FF or by bits having a valve 1. This enables problems to be avoided during the stored data memory case compacting operations. The FF are indispensable for compacting. Once the compacting operation has been started, the temporary FFs allow quick interruption.

It is clear that after multiple modifications or deletions of the data records, the available memory case is reduced. By way of schematic illustration, the part 104 of the dynamic zone represents the memory occupied by the data records on 6 lines before compression, whereas the part 103 represents the memory case free for other records to be stored. For the sake of simplification, the type of each record is represented in FIGS. 5*a* and 5*b* by "ad" for an address record by "di" for a diary record, by "no" for a note record and by "de" for a destruction record. The number of each record introduced is also placed after "ad", "di", "no" and "de".

Each record of each type includes a heading 50, which contains, in particular, a pointer for the following record 51 of the same type and a pointer for the preceding record 52 of the same type, and data fields 60.

In static zone 100, only sets 110, 111, 112 and 113, which include pointers 116 and 117 of the first and last records of each type, and the number 115 of records of each type, are shown in FIGS. 5*a* and 5*b*. An empty zone pointer 114 is also shown in the static zone. The first set 110 relates to the note records. The second set 111 relates to the address records. The third set 112 relate to the diary records. Finally, the fourth set 113 relates to the destruction records.

In FIG. 5*a*, set 110 relating to the note records is taken by way of example. Pointer 116 of the first record of set 110 designates the pointer of the following record of the first note record "no 1" illustrated by arrow 105. The pointer of the preceding record of this first record refers it to pointer 116 of the first record of the set illustrated by arrow 106. A chain is thus established from the first record to the last record of the dynamic zone owing to the heading of each record which includes following and preceding record pointers. The pointer of the following record of the last note record refers it to pointer 117 of the last record in the static zone. Pointer 117 of the last record of set 110 designates the preceding record pointer of the last record. For all the other sets 111, 112 and 113, the same following and preceding record pointer principle is carried out.

Upon each introduction of a new record or when records are modified or deleted, the pointers preceding and following the moved or deleted records are readjusted.

Since the data records of dynamic zone 101 are not stored in an order depending upon the record type, the chain established for each type allows the microprocessor unit to retrieve all the stored data fields quickly in both directions.

Empty zone pointer 114 can be used by the microprocessor unit for indicating the memory capacity used before or after the stored data record memory case compacting operation. This indication can appear on at least one liquid crystal display of the watch.

FIG. 5*b* illustrates schematically data records of the dynamic zone after the compression or compacting operation. During this compacting operation, the microprocessor unit will detect all the empty cases 102 and delete them. Consequently, the records are moved one by one to be put next to the preceding record. After the record has been moved, the preceding and following record pointers are readjusted. The compacting operation starts from the first record detected in the dynamic zone by deleting the preceding empty cases.

Once the compacting operation has finished, all the records follow each other in the dynamic zone from the hexadecimal address 100 directly following the static zone. The duration of this compacting operation can be relatively long, for example 15 minutes if the memory is full. The slowness of the compacting is comprehensible since, the clocking signals provided to the microprocessor unit are of the order of 32 kHz originating from the horological time-keeping circuit.

By way of schematic illustration, part 104 of the dynamic zone represents the memory zone occupied by the data records, illustrated on 4 lines, after compression or deletion of the empty cases between the records. Part 103 represents the memory case free for other records to be stored. The gain in case achieved after the compacting operation will be noted.

From the description that has just been made multiple variants of the manual control device for an electronic watch can be conceived by those skilled in the art without departing from the scope of the invention defined by the claims. The watch may be solely a wristband with watch functions and keys distributed along the length of the wristband. The heading can include more than 8 bytes in which the end of the data record can be indicated, as well as a larger number of sources, for example. Moreover, the EEPROM type non-volatile memory can be replaced by any other non-volatile memory, such as a Flash type memory for example. The sensors arranged on the watch crystal can also be sensors of the piezoelectric type. In this case, the memory compacting operation can be started by pressing at least one sensor with a finger with pressure above a determined threshold.

What is claimed is:

1. A memory management device in an electronic watch with control keys, the device including a non-volatile memory connected to a microprocessor unit programmed to manage data and/or parameter storage and/or deletion operations in the memory, activation of at least one key of the watch allowing an instruction to be provided to the microprocessor unit for managing data and/or parameter storage and/or deletion operations, wherein the memory includes a first static zone for storing data and/or parameters in fixed memory locations and a second dynamic zone for storing data records of different types, the memory location of the records of each type being managed by the microprocessor unit as a function of the modification or deletion of certain records and as a function of the storage of new records, each record starting with a heading in which a first pointer is placed to establish a link between the records of the same type in the dynamic zone of the memory, wherein the microprocessor unit is arranged to compact or compress the stored data record memory case of the dynamic zone automatically or by activating at least one validation key of the watch, and wherein the microprocessor unit switches on a stored data record memory case compacting operation in the dynamic zone when a setting menu is selected by the microprocessor unit under a heading relating to the memory capacity displayed on at least one liciuid crystal display of the watch and when at least one validation key of the watch is activated for a determined period of time.

2. A device according to claim 1, wherein the static zone of the memory includes sets relating to each record type, wherein the number of records and two pointers for first and last records of each type are indicated so as to provide links to each chain in fixed memory locations to the microprocessor unit, and wherein the heading of each record includes a second pointer for determining with the first pointer the following and preceding records of the same type so as to allow the microprocessor unit to run through the records of each chain in two directions.

3. A device according to claim 1, for a diary watch, wherein the types of records to be stored concern note, address, diary and destruction records, wherein the static zone includes an empty zone pointer indicating the end of the last record stored in the dynamic zone so that the microprocessor unit provides control signals to a display drive device of the watch in order to indicate on at least one liquid crystal display of the watch the memory capacity used before or after the stored data record memory space compacting operation.

4. A device according to claim 3, wherein, when a note, address or diary type record is deleted, the microprocessor unit replaces the deleted record by a destruction record at the same location in the dynamic zone, the destruction record including a heading with two following and preceding destruction record pointers.

5. A method for managing memory in an electronic watch, which includes control keys, a non-volatile memory connected to a microprocessor unit programmed to manage data and/or parameter storage and/or deletion operations in the memory, the activation of at least one key of the watch allowing an instruction to be provided to the unit for managing data and/or parameter storage and/or deletion operations, said memory including a static zone for storing data and/or parameters in fixed locations and a dynamic zone for storing data records of different types, the record memory location being managed by the microprocessor unit as a function of the modification or deletion of certain records and as a function of the storage of new records wherein the method includes steps of:

storing data records of at least one type from among several types, each record type starting with a heading in which a first pointer is placed to establish a link between the records of the same type in the dynamic zone of the memory, compacting or compressing the stored data record memory case in the dynamic zone of the memory by the microprocessor unit automatically or by activating at least one validation key of the watch, and displaying on at least one liquid crystal display of the watch a used memory capacity before or after the stored data record memory case compacting operation.

6. A method according to claim 5 in a diary watch wherein the control keys are a determined number of touch sensitive sensors arranged on a watch crystal and a push-button, wherein it includes a preliminary step of:

pressing the push-button of the watch to activate its diary function, the sensors, the liquid crystal display and a part of the microprocessor unit being placed beforehand and/or after a period of inactivity of the diary function in a standby mode.

7. A method according to claim 5, wherein, for the compacting operation, it includes a step of activating the validation key for a determined period of time in a setting menu selected by the microprocessor unit under a heading relating to the memory capacity displayed on at least one liquid crystal display of the watch.

8. A method according to claim 5, wherein, during the compacting operation, it includes steps of:

detecting empty cases from a first data record of the dynamic zone up to a second data record, moving the second data record so that the start of this following record is put next to the end of the first record replacing empty cases between the two records, adjusting the following and preceding record pointers of the second moved record, successively repeating the three steps of empty case detection, record movement and pointer adjustment for all the records of the dynamic zone.

9. A method according to claim 5, wherein it includes, in a data record modifying operation, steps of:

moving the data record to be modified after the last record of the dynamic zone indicated by an empty zone pointer stored in the static zone, modifying the data record, comparing the size of the record before and after modification, if the size of the modified record is larger than the record before modification, this modified record remains the last record and the empty zone pointer indicates the end of this modified record, and if the size of the modified record is smaller than or equal to the size of the record before modification, the modified record is replaced at the initial location in the dynamic zone.

10. A memory management device in an electronic watch with control keys, the device including a non-volatile memory connected to a microprocessor unit programmed to manage data and/or parameter storage and/or deletion operations in the memory, activation of at least one key of the watch allowing an instruction to be provided to the microprocessor unit for managing data and/or parameter storage and/or deletion operations, wherein the memory includes a first static zone for storing data and/or parameters in fixed memory locations and a second dynamic zone for storing data records of different types, the memory location of the records of each type being managed by the microprocessor unit as a function of the modification or deletion of certain records and as a function of the storage of new records, each record starting with a heading in which a first pointer is placed to establish a link between the records of the same type in the dynamic zone of the memory, wherein the microprocessor unit is arranged to compact or compress the stored data record memory case of the dynamic zone automatically or by activating at least one validation key of the watch, and wherein, when a record is deleted, the microprocessor unit replaces the deleted record by a destruction record at the same location in the dynamic zone, the destruction record including a heading with two following and preceding destruction record pointers.

11. A device according to claim 10, wherein the static zone of the memory includes sets relating to each record type, wherein the number of records and two pointers for first and last records of each type are indicated so as to provide links to each chain in fixed memory locations to the microprocessor unit, and wherein the heading of each record includes a second pointer for determining with the first pointer the following and preceding records of the same type so as to allow the microprocessor unit to run through the records of each chain in two directions.

12. A device according to claim 11 for a diary watch, wherein the types of records to be stored concern note, address, diary and destruction records, wherein the static zone includes an empty zone pointer indicating the end of the last record stored in the dynamic zone so that the microprocessor unit provides control signals to a display drive device of the watch in order to indicate on at least one liquid crystal display of the watch the memory capacity used before or after the stored data record memory space compacting operation.

13. A device according to claim 12, wherein the microprocessor unit switches on the stored data record memory case compacting operation in the dynamic zone when a setting menu is selected by the microprocessor unit under a heading relating to the memory capacity displayed on at least one liquid crystal display of the watch and when at least one validation key of the watch is activated for a determined period of time.

14. A device according to claim 10 for a diary watch, wherein the types of records to be stored concern note, address, diary and destruction records, wherein the static zone includes an empty zone pointer indicating the end of the last record stored in the dynamic zone so that the microprocessor unit provides control signals to a display drive device of the watch in order to indicate on at least one liquid crystal display of the watch the memory capacity used before or after the stored data record memory space compacting operation.

15. A device according to claim 14, wherein the microprocessor unit switches on the stored data record memory case compacting operation in the dynamic zone when a setting menu is selected by the microprocessor unit under a heading relating to the memory capacity displayed on at least one liquid crystal display of the watch and when at least one validation key of the watch is activated for a determined period of time.

16. A memory management device in an electronic watch with control keys, the device including a non-volatile memory connected to a microprocessor unit programmed to manage data and/or parameter storage and/or deletion operations in the memory, activation of at least one key of the watch allowing an instruction to be provided to the microprocessor unit for managing data and/or parameter storage and/or deletion operations, wherein the memory includes a first static zone for storing data and/or parameters in fixed memory locations and a second dynamic zone for storing data records of different types, the memory location of the records of each type being managed by the microprocessor unit as a function of the modification or deletion of certain records and as a function of the storage of new records, each record starting with a heading in which a first pointer is placed to establish a link between the records of the same type in the dynamic zone of the memory, wherein the microprocessor unit is arranged to compact or compress the stored data record memory case of the dynamic zone automatically or by activating at least one validation key of the watch, wherein, for a diary watch, the types of records to be stored concern note, address, diary and destruction records, wherein the static zone includes an empty zone pointer indicating the end of the last record stored in the dynamic zone so that the microprocessor unit provides control signals to a display drive device of the watch in order to indicate on at least one liquid crystal display of the watch the memory capacity used before or after the stored data record memory space compacting operation, and wherein, when a note, address or diary type record is deleted, the microprocessor unit replaces the deleted record by a destruction record at the same location in the dynamic zone, the destruction record including a heading with two following and preceding destruction record pointers.

* * * * *